United States Patent Office 3,744,991
Patented July 10, 1973

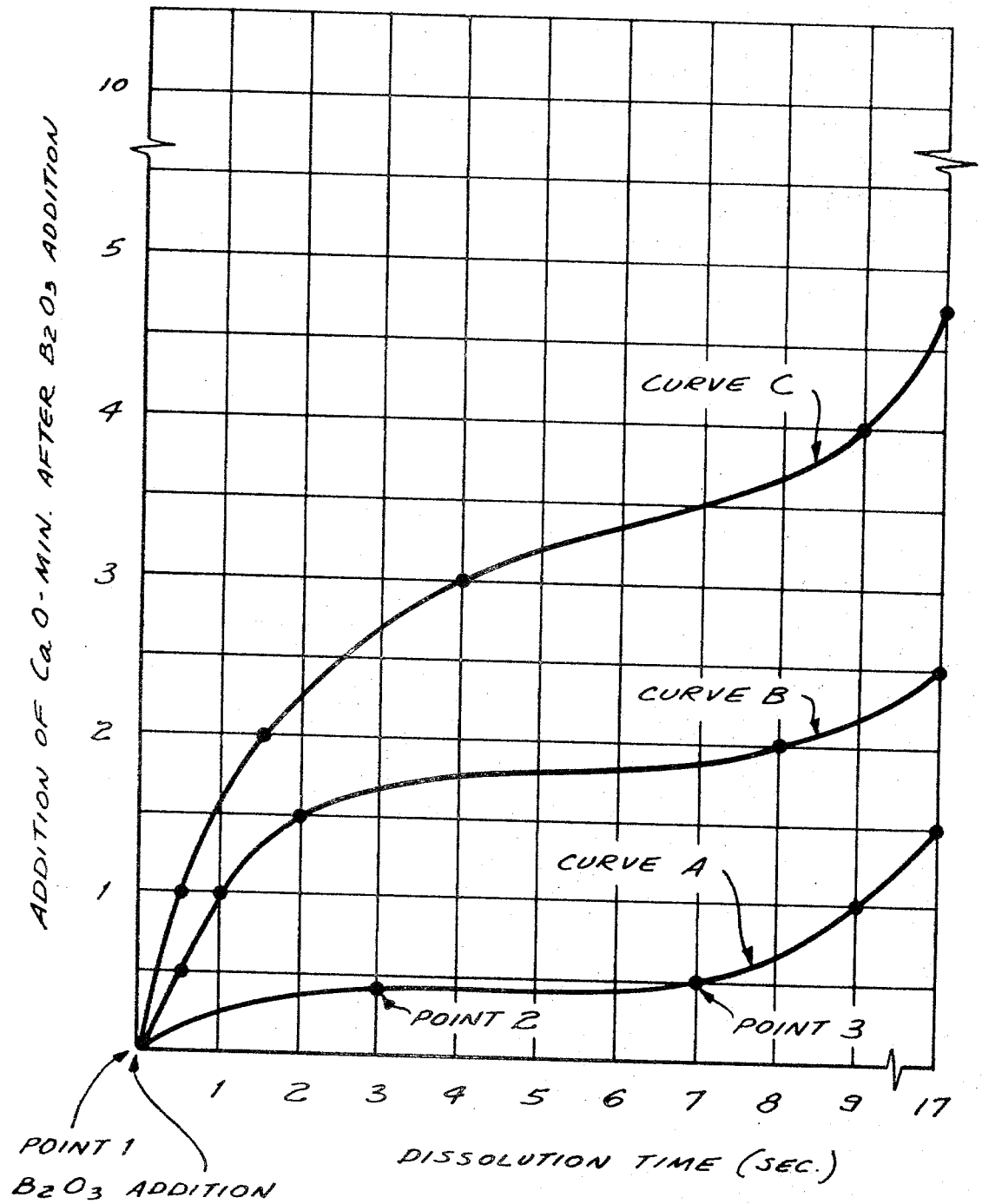

---

3,744,991
ACCELERATION OF THE DISSOLUTION OF LIME IN THE BASIC OXYGEN FURNACE PROCESS
Clifford J. Lewis and Richard S. Bruski, Lakewood, Colo., assignors to Flintkote International Licensing Company, White Plains, N.Y.
Application Aug. 20, 1969, Ser. No. 859,237, now Patent No. 3,574,597, dated Apr. 13, 1971, which is a continuation-in-part of abandoned application Ser. No. 611,277, Jan. 24, 1967. Divided and this application Oct. 6, 1970, Ser. No. 78,576
Int. Cl. C21c 7/00
U.S. Cl. 75—53                                    9 Claims

ABSTRACT OF THE DISCLOSURE

The rate of dissolution of lime in the slag of a basic oxygen steelmaking furnace is accelerated, and slag control is enhanced, by charging lime to the slag in the presence of a boron-containing compound, particularly one that yields an oxide of boron, especially $B_2O_3$, under the operating conditions prevailing in the basic oxygen furnace. Illustrative of such boron-containing compounds used as additives with the lime are boron trioxide, boric acid, anhydrous sodium tetraborate, calcium metaborate, calcined and uncalcined colemanite and rasorite. The additive preferably is delivered to the slag either in intimate mixture with the lime or separately but substantially simultaneously with the lime.

---

This application is a division of copending application Ser. No. 859,237 filed Aug. 20, 1969 for which U.S. Pat. No. 3,574,597 was issued Apr. 13, 1971, which application in turn was a continuation-in-part of our copending application Ser No. 611,277 filed Jan. 24, 1967 now abandoned.

BACKGROUND OF THE INVENTION

The basic oxygen furnace process for producing steel, commonly referred to as the BOF process, has come into extensive use in the United States and in a number of other countries during the past decade. The production of steel by the BOF process has a number of very important advantages over the previously known steelmaking processes, including the basic Bessemer and the basic open-hearth processes. These advantages include low capital investment per ton of steel capacity of the furnace; lower operating costs; improved quality of the steels produced; and a much higher rate of production. The BOF process has made possible the production of good quality steels in a time cycle, from heat to heat, of the order of 25 to 55 minutes, depending upon the size of the charge and of the dimensions of the furnace, compared to a time cycle of the order of 8 to 10 hours in an open-hearth furnace of corresponding capacity.

In the operation of the BOF process, lime is added to the initial siliceous slag formed shortly after the start of the blow of oxygen into the furnace charged with molten pig iron and scrap steel. The initial slag is composed of silicates, primarily ferrous silicate, derived by reaction between the products of oxidation of silicon and the iron contained in the molten metal, which generally occurs within the first minute or two after the beginning of the oxygen blow.

The purpose of the lime addition is to impart to the slag a sufficient basicity to engender and facilitate the necessary chemical reactions between the slag and components in the molten metal to remove managnese, silicon, carbon and other impurities, particularly sulfur and phosphorus, from the molten metal. At the same time, the conditioning of the slag by the addition of the lime thereto, reduces the deteriorating effect of ferrous silicate in the slag upon the refractory lining of the furnace.

The rate at which the added lime reacts with the silica in the slag and with the impurities in the molten metal is thus an important factor in determining the time cycle in the basic oxygen furnace and protecting the refractory lining.

Since the lime is added in solid particulate form to the fluid slag, it must first become dissolved in the fluid slag in order that it may condition the slag for achieving the desired chemical reactions referred to above.

In the normal operation of the BOF process as presently practiced, an average of about 140 to 150 pounds of lime per ton of metallic charge, i.e., molten pig iron and scrap steel, is added to the furnace as above stated. Often, as is well known in the art, fluorspar is added at the same time as the lime or shortly thereafter in order to aid the dissolution of the lime in the slag. Often, of the total amount of lime utilized, approximately 95% thereof is added to the initial slag formed shortly after start of the blow, as above mentioned. The remaining portion is added to the slag several minutes before the end of the oxygen blow period in order to preclude return of sulfur from the slag into the molten metal, to adjust the final basicity of the slag and, equally important, to assure removal or scavenging of the desired quantities of phosphorus from the molten metal.

This amount of lime per ton of metallic charge is about six to eight times the amount of limestone utilized per ton of metal when making steel by the open-hearth process, due to the radical differences between the physical and chemical reactions that occur in the BOF process and those that occur in the open-hearth process. The much higher rate of production and other significant advantages and economies of the BOF steelmaking process are, however, more than sufficient to offset the greater element of cost entailed in having to use a greater quantity of lime per ton of steel production.

In the conventional operation of the BOF process, a substantial portion of the time cycle for a complete operation is accounted for by the time required for the lime to dissolve in the slag, to react with the silica therein and with the sulfur and phosphorus from the molten metal. This length of time partly is due to the relatively slow rate at which the lime dissolves in the slag. The melting and dissolution of the lime in the basic oxygen furnace slag is, of course, closely related to the temperature changes, e.g., from about 1200° C. to about 1600° C., which occur during the blowing period.

Since, in conventional operation of the BOF process, the oxygen blow period may account for approximately one-half the total cycle from heat to heat, it will be seen that a decrease in the time required to dissolve the lime is of great significance in reducing the total time cycle from heat to heat of the BOF process. The importance of rapid dissolution of the lime to enable it to perform its essential action is indicated by the various expedients commonly used in commercial operation of the BOF process, as also in the basic open-hearth and other basic steelmaking processes, to improve the rate of dissolution of the lime. The addition of fluorspar referred to above, which functions by increasing the fluidity of the slag, is the most commonly used expedient for aiding the dissolution of lime. Also, many operators of the BOF process prefer certain types of lime to others because of their belief that such types of lime will become dissolved in the slag at a higher rate than others. Such preference for particular types of lime can impose a significant limitation in the operation of the BOF process for steelmaking.

SUMMARY OF THE INVENTION

With the foregoing considerations in mind, it is according a principal object of this invention to provide a method of accelerating the rate of dissolution of lime in a basic oxygen furnace slag, so that the functioning of the lime used as a fluxing agent in the BOF process for making steel can be greatly facilitated to the end that the time cycle of operation in the basic oxygen furnace can be materially reduced.

Another object of the invention is to provide an improved method of accelerating the rate of dissolution of lime in the production of steel by the BOF process, whereby the oxygen blowing period can be significantly reduced, thereby to effect a corresponding relative reduction in the total time cycle of the basic oxygen furnace, from heat to heat.

Still another object of the invention is the provision of a method of accelerating the rate of dissolution of lime in a basic oxygen furnace slag, which will make possible the use of types of lime heretofore considered undesirable for the purpose.

A further object of the invention is to provide a method for achieving better slag control and enhanced slag conditioning in a basic oxygen furnace, whereby optimum slag conditions can be attained more easily and quickly.

A still further object of the invention is to provide a method whereby protection of the refractory lining is enhancing by increasing the rate at which the slag is conditioned to the desired basicity.

DETAILED DESCRIPTION

Stated broadly, the objects of the invention can be achieved by the use of certain boron-containing additives, as will be more fully hereinafter set forth, that serve to accelerate the rate of reaction between the lime and the initial slag of a basic oxygen furnace by greatly accelerating the rate of solution of the lime in the slag at the temperatures conventionally attained in a basic oxygen furnace.

As above pointed out, the chemical reactions required to convert pig iron into steel of good quality are to a large extent dependent upon the basicity of the slag. The initial slag that is formed in the basic oxygen furnace from the effects of the first minute or two of oxygen blow, during which carbon in the pig iron is converted to gaseous oxides of carbon, consists primarily of silica and contains also ferrous silicate as well as free iron. When this initial slag has been formed in the operation of the BOF process, lime in solid particulate form is then charged into the furnace in order to flux the initial slag and to react with the silica and other components of the slag to effect removal of impurities, such as manganese, sulfur and phosphorus, from the molten metal during the continued blowing of the oxygen. In order that the lime may serve those purposes, it is necessary that it become dissolved in the initial slag and that it impart the necessary basicity to the slag. Hence, the time required for such dissolution of the added lime can be a significant factor in determining the time period of the oxygen blow.

In accordance with the present invention, the dissolution rate of lime in a basic oxygen furnace slag can be increased to a significant extent. Based on the results of work we have conducted, it can be expected that our invention will enable the oxygen blow time in the operation of the BOF process to be significantly reduced. We have discovered that certain additive materials, as hereinafter set forth, bring about a very remarkable acceleration in the rate of dissolution of lime in a basic oxygen furnace slag. Moreover, it is a feature and advantage of the invention that the foregoing significant improvement in accelerating the rate of dissolution of lime in a basic oxygen furnace slag is obtained in the practice of our invention without accompanying introduction of elements inimical to the production of steel.

The additive materials we have found to be effective and highly advantageous for achieving the aforementioned acceleration of the rate at which the lime becomes dissolved in a basic oxygen furnace slag comprise compounds which render the lime highly susceptible to dissolution in the slag and consequent reaction therewith. Under the conditions prevailing in a basic oxygen furnace and in the presence of such additives, the lime rapidly dissolves in the slag and the slag is more quickly conditioned.

More specifically, the additives we have found to act most suitably in achieving the greatly increased rate of dissolution of the lime in siliceous basic oxygen furnace slags and rate of conditioning of such slags are boron-containing compounds, particularly compounds that are oxides of boron, especially $B_2O_3$, compounds that contain oxides of boron and compounds that under the operating conditions of a basic oxygen furnace yield oxides of boron. Examples of boron-containing compounds that we have successfully employed in practicing the invention are boron trioxide, boric acid, anhydrous sodium tetraborate (borax), calcined colemanite, calcium metaborate and rasorite. Other boron-containing compounds that accelerate the rate of dissolution in the slag of a basic oxygen furnace include minerals such as calcined and un-calcined colemanite, ulexite, inderite, kernite and kurnakovite. It should be noted that mixtures of these compounds, and commercially available materials containing these compounds, can also be used as the additives in accordance with the invention.

These additives function rapidly upon contact with the siliceous basic oxygen furnace slag. Accordingly, they should be introduced to the slag substantially simultaneously with the charging of the lime thereto, or at such time thereafter as it becomes necessary to effect an increase in the rate of dissolution of undissolved lime previously charged to the slag. The lime and the additive can be either separately but substantially simultaneously introduced into the furnace, or the additive can be pre-mixed or otherwise pre-combined with the lime.

The greatly increased rate of dissolution of lime in a siliceous basic oxygen furnace slag resulting from the use of the additives in accordance with the invention, as compared to the rate of dissolution in the absence of such additives, has been demonstrated and practiced on a "hot stage" microscope, which operates in the following manner:

On the stage of the microscope there is placed a small crucible containing the material to be viewed. Electric resistances are arranged as part of the assembly to bring the material in the crucible to the temperature required for melting the same. The resistances are controlled to maintain the molten material at the desired temperature. The assembly includes also a supply box carried on a pivoted arm above the crucible, whereby measured amounts of additives placed in the supply box may be discharged therefrom onto the surface of the molten material in the crucible when the pivoted arm is swung into a position directly above the latter. Thus, with this instrument, physical effects can be readily observed and photographed, if desired, at elevated temperatures and under any desired atmosphere, and with magnifications up to about 100 diameters.

We have accordingly used the hot stage microscope to observe and measure the dissolution rate of various limes in basic oxygen furnace slags, the observed dissolution rate as measured by a stop-watch being recorded. We have observed and measured the dissolution rate of the lime in a basic oxygen furnace slag in the absence of any additives and in the presence of measured amounts of various additives which were added with, and at various time intervals before or after, the addition of the lime. We have been able in this way to determine the effect of various additives present in the system in relation to the dissolution rate of the lime, or in other words, the reaction rate between the lime and the other components in the basic oxygen furnace slag. The effectiveness of the compounds used as additives in accordance with the invention is demonstrated by the data set forth herebelow, obtained on a hot stage microscope as referred to above.

In a series of demonstrations, the basic oxygen furnace slag and the lime were of the compositions set forth below. In certain of the demonstrations, only the lime was added to the molten slag; in others the lime particles had first been pretreated by mixing them with one or another of each of the several additives. The additive compounds used in accordance with the invention were anhydrous borax [$Na_2B_4O_7$], boric acid [$H_3BO_3$], boron trioxide [$B_2O_3$], calcium metaborate [$Ca(BO_2)_2$] and calcined or anhydrous colemanite [$Ca_2B_6O_{11}$].

In each of the aforementioned demonstrations, the compositions of the lime and of the basic oxygen furnace slag used were:

| Lime composition: | Percent |
| --- | --- |
| CaO | 96.10 |
| MgO | 0.97 |
| $Fe_2O_3$ | 0.11 |
| $Al_2O_3$ | 0.30 |
| $SiO_2$ | 0.62 |
| LOI | 1.43 |
| Total | 99.53 |

| Slag composition: | Percent |
| --- | --- |
| $SiO_2$ | 47.26 |
| FeO | 16.05 |
| MnO | 16.05 |
| $Al_2O_3$ | 3.92 |
| $P_2O_5$ | 3.52 |
| MgO | 3.39 |
| CaO | 10.00 |
| Total | 100.19 |

The maximum dissolution times of the solid particulate lime in the slag, as observed and recorded in the control demonstrations and the demonstrations wherein one of the additive compounds was used, are shown in the following tabulation:

TABLE I

| | Maximum dissolution time (in seconds) |
| --- | --- |
| Control, no additive | 16.6 |
| $Na_2B_4O_7$ as additive | 0.8 |
| $H_3BO_3$ as additive | 0.7 |
| $B_2O_3$ as additive | 0.7 |
| $Ca(BO_2)_2$ as additive | 2.0 |
| $Ca_2B_6O_{11}$ as additive | 2.0 |

Thus, as shown by the data in Table I, the boron-containing compounds serve outstandingly to increase the rate of dissolution of lime in basic oxygen furnace slag, resulting in a very rapid dissolution of the lime particles in the slag.

A similar demonstration was made with other boron-containing compounds in a basic oxygen furnace slag at 2300° F. having substantially the same composition as the one identified above. The additive compounds used were ulexite [$NaCaB_5O_9 \cdot 8H_2O$], colemanite $$[Ca_2B_6O_{11} \cdot 5H_2O],$$

inderite [$Mg_2B_6O_{11} \cdot 15H_2O$], kernite [$Na_2B_4O_7 \cdot 4H_2O$] and kurnakovite [$Mg_2B_6O_{11} \cdot 13H_2O$]. Each was tested in its uncalcined state and also after roasting for one hour at 1000° F. and at 2000° F. Table II shows the data for these additives:

TABLE II

| | Dissolution time [1] (seconds) |
| --- | --- |
| Control, no additive | 26.0 |
| Ulexite | 2.5 |
| a [2] | 3.0 |
| b [3] | 2.0 |
| Colemanite | |
| a | 1.5 |
| b | 1.5 |
| Inderite | 7.0 |
| a | 8.0 |
| b | 8.0 |
| Kernite | 4.0 |
| a | 2.5 |
| b | 3.0 |
| Kurnakovite | 8.0 |
| a | 5.0 |
| b | 4.0 |

[1] Average of 5 tests using 5 lime particles with one additive particle, −20 +30 mesh.
[2] a indicates roasted at 1000° F.
[3] b indicates roasted at 2000° F.

As will be recognized by those skilled in the art, such a highly accelerated rate of dissolution of the lime particles in a molten basic oxygen furnace slag will result in an increase in the rate at which the lime reacts with the silica and the impurities in the molten metal in a basic oxygen furnace. As is well known, the rate at which these reactions occur is an important factor in determining the length of the time cycle from heat to heat in the BOF process. By accelerating the rate of dissolution of the lime in the basic oxygen furnace slag, as demonstrated by the data in Tables I and II, it will be recognized that the control and conditioning of the slag can be enhanced and that a substantial reduction can be achieved in the amount of time required for the oxygen blow of the BOF process to accomplish its purpose in converting the contents of the metal bath to the desired composition for tapping the molten steel and drawing off the slag.

An additional salient feature of the invention is that the aforementioned increase in the rate of dissolution of lime in a basic oxygen furnace slag by the practice of the invention is obtained with the use of relatively small amounts of the additive, and without introducing elements which are inimical in the manufacture of stel, such as frequently occurs when using agents that have been used previously to aid the dissolution of the lime particle in the slag. Thus, fluorspar, which is a material widely used to aid the dissolution of lime in the slag, functions by reducing the viscosity of the slag. The resultant slag takes on an almost "watery" condition, and this permits the lime to fall into the slag and get below the surface thereof where it can begin to dissolve. Much higher proportions of fluorspar, as compared to the proportions of the additive compounds of the present invention, relative to the amount of lime charged into the furnace generally are required to obtain the necessary dissolution of the lime in the slag. Moreover, the use of such higher proportions of fluorspar, in the effort to obtain the desired rate of dissolution of the lime in the slag, frequently causes such an excessive thinning of the slag that it tends to "slush" up around the side wall of the furnace vessel where it not only does not participate effectively in the operation of the BOF process but also tends to exert a deteriorating action upon the refractory lining of the vessel and to interfere with the pouring of the finished molten steel from the vessel. Another detrimental aspect of fluorspar is that it is a very harmful air pollutant which is difficult to eliminate. The foregoing effects also occur to varying degrees in the case of other fluoride compounds, such as sodium fluoride and sodium silicofluoride, which have heretofore been used to aid dissolution of lime in silicate basic oxygen furnace slags.

A further unexpected feature and advantage of the invention is that it is not essential for each particle of the lime to contain or be associated with the additive compound upon contacting the slag, but only that a sufficient amount of the additive compound be added to the slag to bring about the desired effect.

The foregoing was demonstrated on the hot stage microscope above mentioned. In these demonstrations, there was placed in the crucible of the hot stage microscope assembly a quantity of basic oxygen furnace slag of the same composition as referred to in the first series of demonstrations set forth above. After bringing the slag in the crucible to a temperature of 2500° F., there were quickly dropped onto the surface of the molten slag, by means of the pivoted supply box of the assembly, 35 particles of lime, only one of which had been previously treated with anhydrous borax. This treatment was accomplished by quickly dipping the one particle in melted borax and allowing the thus applied borax to cool and solidify on the surface of the lime particle. The particles of lime were of the same compositions as those of the lime used in the first above-mentioned series of demonstrations. Upon dropping the 35 lime particles simultaneously onto the molten slag in the crucible, which was at a temperature of 2500° F., the 34 untreated lime particles as well as the one treated particle disappeared into and became dissolved in the molten slag in less than one second. This rather spectacular and unexpected result demonstrated that in the practice of the invention it is necessary only that a sufficient amount of the additive be carried to the basic oxygen furnace slag, and that this can be achieved without the necessity for each of the lime particles to carry the additive compound.

Reference has been made to the use of the additives for accelerating the rate of dissolution of the lime in the initial slag formed within the first minute or two of the oxygen blow in the BOF process. As indicated, about 95% of the total amount of the lime used in each heat can be added at that time, the remainder being added when the slag has reached a stage in the oxygen blow period when further addition of lime is required in order to adjust the basicity of the slag for scavenging phosphorus from the molten metal and for preventing the return of sulfur thereto. Accordingly, the use of the additives herein referred to, for accelerating the dissolution of the lime added at that state, would also be valuable in contributing to the reduction of the oxygen blow cycle.

This aspect of the invention was demonstrated in the hot stage microscope by comparing the dissolution rate of untreated lime and additive-treated lime in slag removed from a basic oxygen furnace after 14 minutes of the oxygen blow period. The composition of this slag was as follows:

| | Percent |
|---|---|
| $SiO_2$ | 22.60 |
| CaO | 58.30 |
| $Al_2O_3$ | 1.40 |
| MgO | 1.96 |
| $P_2O_5$ | 1.92 |
| MnO | 5.40 |
| FeO | 8.44 |
| S | 0.0 |

The lime utilized for the above-mentioned comparison was of the same composition as that utilized in the first above-mentioned series of demonstrations. The average dissolution time for ten untreated lime particles in this slag at 2500° F. was 4 minutes whereas the maximum dissolution time was 10 seconds when eight untreated lime particles and two particles treated with $B_2O_3$ were dropped simultaneously on this slag.

In the description of the invention hereinabove, reference has been made to the mode of addition of the described additive compounds from the standpoint of the relative order and time of addition of the lime and the additive to the slag. The essential consideration for gaining the benefits of the herein described additives is that as long as undissolved lime is present these additives will accelerate ethe dissolution of the lime in a molten basic oxygen furnace slag. When their addition precedes the addition of the lime, the time interval elapsing therebetween becomes rather critical, probably because of fairly rapid volatilization of the additives within a brief period under the influence of the temperatures prevailing in a basic oxygen furnace. We have found that when the additive is charged into the furnace prior to charging the lime, the latter step should follow within a relatively short period in order to secure the maximum effect with a minimum quantity of the additive. The phrase "substantially simultaneously," as used herein with reference to the time of introduction of the additive and the lime, is thus intended to include introduction of the additive a short time prior to the introduction of the lime.

Data obtained from a series of demonstrations conducted on the hot stage microscope, to determine the influence of the period of time elapsing between the addition of an additive and the subsequent addition of the lime to the slag, are depicted by the curves of the graph constituting the accompanying drawing. In this series of demonstrations, there was placed into the crucible of the hot stage microscope a sample of siliceous basic oxygen furnace slag removed from an operating basic oxygen furnace just prior to the addition of lime in the normal operation of the furnace. Boron trioxide was used as the additive and was added directly to the slag, which was at a temperature of 2500° F. in the crucible. Measured time intervals were then allowed to elapse before the lime was subsequently dropped onto the surface of the thus treated slag.

Curves A, B and C of the drawing show the time required for dissolution of the subsequently added lime when measured amounts thereof, as hereinafter indicated, were added at various intervals after the boron oxide had been dropped onto the surface of the slag. The amount of boron oxide added in the form of particles of −20+30 mesh to the slag was:

| | Particles |
|---|---|
| Curve A | 1 |
| Curve B | 10 |
| Curve C | 20 |

Point 1 on the graph represents the only time when boron oxide, in the amounts indicated above, was dropped onto the slag. Each point on each curve beyond Point 1 represents 5 particles of lime dropped onto the slag at different time intervals after the above-mentioned respective amounts of boron oxide had been dropped. Thus, as shown by Point 2 on Curve A, fine lime particles, dropped twenty-five seconds after one particle of boron oxide had been dropped, became dissolved in three seconds. Point 3 on Curve A represents a five lime particle drop at an interval of 30 seconds after the drop of the boron oxide particle, in which instance the time for dissolution of the lime in the melt was seven seconds. In the case of curve B, five lime particles, dropped at an interval of 30 seconds after ten particles of boron oxide had been dropped, became dissolved in the melt in about one-half second; five lime particles, dropped at an interval of sixty seconds after the drop of the ten particles of boron oxide, became dissolved in one second; five lime particles, dropped at an interval of ninety seconds following the drop of the ten boron oxide particles, became dissolved in two seconds; and five lime particles, dropped at an interval of 120 seconds after the ten boron oxide particles had been dropped, required eight seconds to become dissolved. The figures for time of dissolution of the five particles of lime at corresponding intervals after twenty particles of boron oxide had been dropped, will be readily apparent from the locations of the points on Curve C of the drawing.

The data represented by the curves of the drawing indicate that in practicing the invention the boron-containing additive is preferably added to the slag at the same time as or after the lime is added, although it may be added a short time prior to the addition of the lime, should this be desirable from a processing standpoint.

Notwithstanding the foregoing, it has also been found that addition of the additive compounds during the oxygen blow cycle of the process, or during a reblow cycle, aids markedly in shaping the slag.

At present it appears that the amount of the additive compounds to be used according to the invention can vary widely depending on the operating conditions of the basic oxygen furnace, e.g., its temperature and the kinds and proportions of materials charged to it, the time and manner by which the additive is charged to the slag, and the amount of the lime charge. Although enhanced dissolution of the lime in the slag and better conditioning of the slag is obtained by using the additives in an amount of about ½% by weight of boron in the boron-containing compounds based on the weight of lime, better results are attainable by using at least about 1%, and preferably about 2%, of the additive compounds based on the amount of lime. At such levels of addition, a marked increase is obtained in the rate of build-up of the V-ratio, i.e., the ratio of lime to silica in the slag that is an indicia of the refining efficacy of the slag. There appears to be no upper limit on the amount of additive compounds that can be used. Practical considerations, however, suggest that no more than an amount a few percent greater than 2%, e.g., about 5%, based on the amount of lime be used. Such considerations include economics, i.e., the cost of the additive relative to the additional benefit obtained by using more than about 2%, and untoward effects on the slag, for example, excessive thinning and loss of slag control that begin to be factors at additions rates of around 5% despite the rapid rate of build-up of the V-ratio. These values, of course, vary somewhat depending upon the specific additive utilized, although a range of from about 1% to about 3.5% generally is preferred.

Data from pilot plant and actual commercial scale tests indicate other favorable results provided by the invention. For example, the use of the additive compounds mentioned herein enables good slags to be shaped, or developed, much earlier during the course of the oxygen blowing period. Smooth, creamy slags that are fluid and well-workable but relatively free from gas, sloppiness and undissolved lime particles, or lumps, have consistently been obtained more rapidly than without the additives, for example, in from about 2 to about 8 minutes, in contrast to operating with fluorspar which tends to give inconsistent slags generally over longer periods, or with no additives, in which case desirable slags sometimes are not obtained or are properly shaped only toward the very end of the oxygen blowing period. Use of the present method also results in a more prompt increase of the V-ratio.

These factors are desirable in that they tend to assure better refractory protection, dephosphorization, desulfurization at the end of the blowing period and easier capping of the heat.

In the demonstrations previously described, the limes utilized were commercial forms of high calcium quicklime, i.e., CaO plus minor amounts of impurities. Similar results are obtained by the use of the additive compounds of the invention in conjunction with commercial forms of dolomitic quicklime, i.e., CaO·MgO plus minor amounts of impurities. This was demonstrated by comparing (a) the dissolution time of ten particles of dolomitic quicklime when added to a molten basic oxygen furnace slag of the same composition as used in the first above-mentioned series of demonstrations, with (b) the dissolution time when ten particles of the dolomitic quicklime were added to the molten slag simultaneously with the addition of one particle of $Na_2B_4O_7$ treated dolomitic lime. In the first instance, the maximum dissolution time of the ten particles of lime was fifteen seconds, whereas in the second instance the maximum dissolution time for the eleven particles, only one of which carried the additive, was less than one second.

Since, as pointed out above, the additives hereof can be as effectively used for accelerating the dissolution rate of dolomitic quicklime as well as for accelerating that of high calcium quicklime in a basic oxygen furnace slag, the term "lime" as used herein is to be considered, unless otherwise qualified, as embracing both high calcium quicklime and dolomitic quicklime.

Numerous demonstrations on the hot stage microscope have also been conducted to determine the effect, if any, exerted by the composition of the atmosphere existing over the molten basic oxygen furnace slag upon the accelerated rate of dissolution of the lime in the slag obtained by the use of the additive compounds of the invention. These demonstrations were conducted with atmospheres of air, oxygen, nitrogen, argon, carbon dioxide and carbon monoxide over the molten slag, using untreated lime as the control, and lime treated with boron oxide. The dissolution rates in each case were identical with those in the first of the above-mentioned series of demonstrations. Thus, it is apparent that the results obtained by the use of the additive compounds of the invention are neither dependent upon nor altered by the composition of the atmosphere over the molten basic oxygen furnace slag-lime system.

It will be understood that various departures from the specifically disclosed embodiments of the invention can be effected without departing from the scope thereof as defined by the following claims.

We claim:

1. A slag composition for use as the slag in the production of steel by the basic oxygen process which consists essentially of an admixture of lime in solid particulate form and an additive compound that is an oxide of boron, that contains an oxide of boron or that yields an oxide of boron under the operating conditions prevailing in a basic oxygen furnace.

2. A slag composition for use as the slag in the production of steel by the basic oxygen process which comprises an admixture of lime in solid particulate form and from about ½% to about 5% by weight of boron based on the weight of said lime of an additive compound that is an oxide of boron, that contains an oxide of boron or that yields an oxide of boron under the operating conditions prevailing in a basic oxygen furnace.

3. A slag composition as defined in claim 2 wherein said additive compound is boric acid, anhydrous borax, boron trioxide, calcium metaborate, colemanite, rasorite, ulexite, inderite, kernite or kurnakovite.

4. A slag composition as defined in claim 1 wherein said additive compound is boric acid, anhydrous borax or boron oxide.

5. A slag composition as defined in claim 1 wherein said additive compound is boric acid.

6. A slag composition as defined in claim 1 wherein said additive compound is anhydrous borax.

7. A slag composition as defined in claim 1 wherein said additive compound is boron oxide.

8. A slag composition as defined in claim 1 wherein said additive compound is colemanite.

9. A slag composition as defined in claim 2 wherein said composition contains from about 1% to about 3.5% by weight of boron based on the weight of said lime.

References Cited
UNITED STATES PATENTS

| | | | |
|---|---|---|---|
| 898,116 | 9/1908 | Kretschmer | 75—53 |
| 1,559,342 | 10/1925 | Mattice | 75—53 |
| 3,311,465 | 3/1967 | Ban | 75—54 X |

HYLAND BIZOT, Primary Examiner

J. E. LEGRU, Assistant Examiner

U.S. Cl. X.R.

75—58, 129

UNITED STATES PATENT OFFICE
CERTIFICATE OF CORRECTION

Patent No. 3,744,991　　　　　　　　Dated 7/10/73

Inventor(s) Clifford J. Lewis et al.

It is certified that error appears in the above-identified patent and that said Letters Patent are hereby corrected as shown below:

Column 2, line 30, before "start" insert -- the --; Column 6, line 69, change "stel" to -- steel --; Column 8, line 25, change "ethe" to -- the --, and line 74, change "fine" to -- five --; Column 10, line 7, change "capping" to -- tapping --.

Signed and sealed this 12th day of March 1974.

(SEAL)
Attest:

EDWARD M. FLETCHER, JR.　　　　　　C. MARSHALL DANN
Attesting Officer　　　　　　　　　Commissioner of Patents